Patented Jan. 21, 1941

2,229,602

UNITED STATES PATENT OFFICE 2,229,602

FOOD CONTAINER

James Wallace Raynolds, Pittsburgh, Pa., assignor to The Raolin Corporation, New York, N. Y., a corporation of West Virginia No Drawing. Application December 18, 1936, Serial No. 116,649

2 Claims. (Cl. 220—64)

This invention relates to food containers; and it comprises a food container with a lining of cured rubber chloride containing a minor amount of a softening agent in solid solution as a poreless structureless continuum free of solvents and of hygroscopic solid inclusions, said lining being stable, non-brittle and resistant, withstanding treatment in accelerated tests with hot water and with toluene; all as more fully hereinafter set forth and as claimed.

The object achieved in the present invention is the conversion of rubber chloride into a completely satisfactory varnish for lining and coating food containers of metals and other materials; beer cans, wine cans, cans for fruit, vegetables and meats, paper milk bottles. In so doing the use of various expedients, hereinafter set forth, is indicated for reasons explained.

Rubber chloride is made by chlorinating ordinary rubber and in mass is a brittle resin, nearly uninflammable, inert against reagents and insoluble in, and not affected by most solvent liquids including petroleum hydrocarbons. It is, however, soluble in coal tar oils, including benzol and toluol and in various chlorinated hydrocarbons, including carbon tetrachloride. Made into a varnish with toluol or the like, rubber chloride gives a good but brittle film on drying by evaporation, the film going through the usual gel stage and retaining residual solvent with tenacity. Gel and film are completely reversible. No chemical change occurs in the rubber chloride. Such a film, however, does not bond well with metal, is brittle and does not long withstand soaking with water.

To make a useful varnish it is necessary to incorporated a softening agent in amount sufficient to obviate the inherent brittleness; a liquid or soft solid permanent in air. The resistance of the dried film to moisture, solvents and reagents is then qualified by the presence of the plasticizer and if the mixture is not homogeneous, it may be that of the plasticizer alone. To produce a satisfactory film it is necessary that a plasticizer, in small amount, shall be in solid solution in a rubber chloride continuum and that it shall be as inert chemically; considerations making choice a matter of some difficulty.

Another difficulty in making a satisfactory varnish is the presence in all commercial rubber chloride of fine distributed solids of hygroscopic nature; a carry-over from the raw rubber which contains a certain amount of proteid in hydrated forms. Sugars and other non-rubbery substances are also present. In making rubber chloride from caoutchouc it is usual to chlorinate in solution in hot carbon tetrachloride. The rubber chloride solution made carries the foreign matters of the rubber as fine particles, mostly of colloidal fineness making it hazy or turbid. There is always a Tyndall effect. These suspended particles are completely dehydrated and are hygroscopic, taking up water with considerable avidity and reswelling. It is a common fault of rubber chloride varnishes that they will not withstand soaking in water for any time without turning white or disrupting as the case may be. Any rubber chloride varnish swelling and becoming opaque in an accelerated test with hot water or condensing steam, does not give complete protection to underlying metal; there is the possibility of avenues opening for access of corrosive agents. Such a varnish is not satisfactory for food containers.

In the absence of these hygroscopic solid impurities a properly made and plasticized rubber chloride film on aluminum shields it indefinitely from the action of caustic soda; copper is shielded against strong nitric acid, etc.

In making a completely satisfactory rubber chloride varnish for good containers, however, another chloride varnish for good containers, however, another condition is necessary; the absence of any retained volatile solvent slowly escaping and giving taste and odor. Toluene and the like are quite soluble in solid rubber chloride. In making the varnish the use of what I may call a "balanced solvent" is useful, a solvent mixture which tends to evaporate as a whole; that is, without fractionation. But the trouble can only be completely avoided by reducing the solvent power of rubber chloride for volatile solvents; by the adoption of a special type of cure for the dried varnish film which I have elsewhere called "petronization." Petronization has certain other advantages in this relation.

To make a completely satisfactory varnish for lining food containers all the details mentioned are important.

As one detail, it is necessary to start with clean and pure rubber chloride; rubber chloride free of the stated hygroscopic solid impurities carried over from the rubber. For the sake of a name, these impurities may be here called "haze." Some commercial rubbers, like that known as "deproteinized" rubber are quite free of these impurities. Raw rubber may be freed of them by dissolving in benzol, carbon tetrachloride, or the like to about a 3 per cent solution, depolymerizing by long boiling under reflux to reduce the viscosity and then giving a treatment, followed by filtering or clarifying, with an addition of some commercial decolorizing carbon such as Eponite and some form of diatomaceous earth preparation such as one of the commercial filter aids available under various trade names. The conjoint adsorbing action of these two materials is generally necessary to obtain good filtration or clarification. Neither alone is as satisfactory. The haze particles are too fine either to settle or be filtered out, but they can be adsorbed under proper conditions to give particles susceptible of removal. Or, the rubber may be dissolved in carbon tetrachloride, depolymerized by long boiling under a reflux and then chlorinated; the chlorinated rubber solution being filtered and treated as before. It makes a better product to effect a filtration of both the raw rubber and the rubber chloride. In chlorinating there is an excess of free chlorine left and a considerable amount of HCl is formed. It is usual to obviate these by the addition of a little lime or calcium carbonate. This is supposed to carry down impurities but it does not and solid matter is added to the liquid. Better results are obtained by air-blowing the hot solution under a reflux until the residual liquid shows substantial neutrality on test. Treatment with adsorbents and filtration follow the liming or the air-blowing treatment, whichever is used.

The purified rubber chloride is recovered from the solution in any known manner, as by boiling with water to get rid of solvent by azeotropic distillation. This gives the rubber chloride as a sponge which may be dried and fine ground. It is haze free.

In making a rubber chloride varnish, the fine ground pure chloride is treated with a plasticizer in small amount with merely enough volatile solvent to give a homogeneous single phase mass. Addition of the full amount of thinner required for varnish at this time does not give as good results as the production of a continuum prior to thinning. Stirring should be vigorous and continued until solvation is effected; until a homogeneous single phase composition results. Solvated rubber chloride can afterwards be thinned with, or dispersed in, volatile solvent to give a brushing varnish or a spray varnish.

In making a varnish it is further advantageous to use the expedient mentioned ante; to use a mixture of volatile solvents of different vapor tensions in such proportions that the solvent tends to evaporate in the air as a whole. With such "balanced solvent" there is less tendency for the retention of solvent in the dried varnish. In another prior and copending application Serial No. 69,416 I have described and claimed various mixtures of volatile solvents used together in such proportions as to give a balancing effect. Any of the mixtures therein described can be here employed.

As so far described, a varnish is made of excellent quality capable of shielding metals completely and resisting all ordinary chemical reagents indefinitely long. The dried film is still soluble in toluene, etc., and it is not free of odor and taste giving residual volatile solvents. It is, however, resistant to water solutions and to most solvents, being free of hygroscopic solids, or haze, and containing no unsolvated, that is, unincorporated plasticizer. It withstands accelerated tests with hot water and condensing steam. It clings to metal, however, only fairly well.

A much better varnish for food containers and incidentally one which coheres to metal better is made by resorting to the expedient mentioned ante as petronization; a sort of cure in the presence of added materials which shrink and densify the film and abolish its affinity for volatile solvents more or less completely. In another and copending application Serial No. 69,414, I have described a number of additions which can be made to rubber chloride to effect this petronizing result. On addition of a small amount of one of these substances, and a short heating at, say 80° C., the rubber chloride of the solvated compositions and the composition itself, change profoundly in character. In a way the change is analogous to that produced by vulcanization in rubber or to the changes undergone in coagulation of a proteid by heat. A film shrinks and tightens, develops an increased coherence to underlying metal and readily loses retained volatile solvents; the volatile solvent in solid solution in the dried film is, so to speak, "kicked out." The dried film and the gel are no longer reversible and the extent of the changes in petronization can be followed by test with toluene. A completely petronized dried film does not swell in toluene or yield to it.

In the most satisfactory varnish lining for food containers, such as beer cans, which I have devised, all these expedients are used; a rubber chloride is employed free of haze. This is solvated to give a continuum or single phase body, which is thinned with or dispersed in, a proper amount of a balanced solvent to make a spraying or brushing varnish as may be required. To this mixture a little petronizer is added, the varnish is applied to the container, dried in place and cured by an hour or so heating at about 80° C. This produces, as noted, shrinking and inner changes which I have called petronization. The progress of the cure can be followed by a test with toluene. Completely petronized solvated rubber chloride neither dissolves in nor swells with toluene.

Metal coated with well plasticized and petronized clean rubber chloride is permanently shielded against corrosion. Such a coating layer gives no taste, odor or color to any food or beverage with which it is in contact. Even beer and wine, in which small changes in taste are perceptible, can be stored for long periods of time in contact with such a coating. The coating may be applied to a food container of any material, steel or iron, tinned metal, paper, etc. In applying it to the ordinary tinned iron, the tin adds no additional protective effect and ordinary clean, acid-pickled iron or steel is quite as good. The varnish may be pigmented with any non-hygroscopic ordinary pigment or filler. In petronization there is, as stated, a certain amount of shrinkage and the use of a filler is therefore advantageous. The varnish has but little color when well made and it may be tinted or dyed in well understood ways.

Reverting to the plasticizer, there is considerable room for choice. In all cases the plasticizer must be a substance which will modify the brittleness of rubber chloride, be permanent in air and withstand, at least to a reasonable extent, the action of water whether acid or alkaline. In a well solvated rubber chloride composition in which the softener is a minor constituent in solid solution in rubber chloride, however, it is to a large extent shielded. Solvation with the production of a continuous single phase body of rubber chloride and plasticizer is a fundamental necessity for the present purposes. Not all of the ordinary plasticizers can be readily and homogeneously blended with rubber chloride but many can. And it is found in practice that the presence of a good solvating agent, even in minor amount, sometimes permits the incorporation of plasticizers which alone are not particularly suitable. In another and copending application I have described a number of plasticizers which can be used, singly or in admixture, in solvating rubber chloride. Various of the solvating materials there mentioned are useful; the choice for the present purposes, however, being limited by the necessity for a tasteless, odorless dried varnish film.

In making varnish linings for food containers under the present invention, among the best plasticizers or solvating agents I have found are the alkyl esters of benzoyl benzoic acid, the di-alkyl and di-aryl esters of phthalic acid, the tri-alkyl esters of phosphoric acid and the fatty acid ethers of the alkyl esters of ethylene glycol. The following compounds illustrate the various classes of solvating agents which are useful:

(1) Alkyl esters of benzoyl benzoic acid
  Butyl ortho benzoyl benzoate
  Ethyl ortho benzoyl benzoate
(2) Di-ester of phthalic acid
  Di-butyl phthalate
  Di-ethyl phthalate
  Di-methyl phthalate
  Di-phenyl phthalate
(3) Tri-alkyl phosphate
  Tri-butyl phosphate
(4) Fatty ester of the alkyl ether of ethylene glycol
  Butyl ether of ethylene glycol stearate
  Methyl ether of ethylene glycol palmitate
  Ethyl ether of ethylene glycol oleate The members of class 4 are good solvating agents and in their presence the composition will tolerate considerable amounts of the cheaper members of classes 2 and 3.

A particularly good beer can lacquer, useful also for other food containers, can be obtained by using the butyl ether of ethylene glycol stearate in about the proportion of 23 per cent on the dry varnish film. In admixture with a little volatile solvent this solvates rubber chloride well, forming a continuum in which rubber chloride is the major component and producing a coating which petronizes satisfactorily. Butyl-phthalyl butyl glycolate is another plasticizer or solvating agent that may be used.

Among useful petronizers for the present purposes I may list di-phenyl guanidine, di-ortho-tolyl guanidine and tri-phenyl guanidine. In making a good well petronized lacquer film any of these can be used in the proportion of about 0.5 per cent to 1 per cent of the final dry varnish film.

Various proportions of mixed coal tar oils may be used in making a balanced solvent. To some extent, the particular ratio and composition desired depend on the "viscosity" of the rubber chloride. The higher the viscosity the more solvent is required to make a flowing varnish. However, one composition which I have found quite generally useful with rubber chloride is a balanced solvent comprising p-methyl isopropyl benzene, decahydronaphthalene, toluol and xylol. In all cases in making the varnish a small proportion of the volatile solvent is used in blending the chloride and the plasticizer; not enough to cause the production of a two-phase system. Afterwards, the composition is dispersed in the rest of the solvent. It is found that when the rubber chloride and the plasticizer are added separately to the main body of the solvent they do not form the desired type of mutual solution. It appears that rubber chloride tends to take up volatile solvent to saturation and afterwards it will not blend with the plasticizer. In a varnish made by directly adding rubber chloride and a plasticizer to a body of volatile solvent, on drying there may be no union; the rubber chloride may occur merely as a resinous filler in a continuum of plasticizer. Unless plasticizer and rubber chloride occur as a one-phase mixture or blend, on drying the varnish, flaws and defects will occur. Varnishes containing free plasticizer as a honeycomb or as isolated areas rarely resist accelerated hot water tests.

In a particular embodiment of the present invention intended for lining beer cans of clean naked steel, a clean rubber chloride is first produced using one of the ways stated. Commercial rubber chloride can be used provided it is first brought into solution in tetrachloride or benzol, boiled for awhile under reflux, treated with a little decolorizing carbon and filter aid, filtered and recovered. This is to get rid of the non-rubber impurities carried over from the rubber and occurring in all commercial rubber chloride.

In making a beer lacquer with rubber chloride solvated by 23 per cent of the butyl ether of ethylene glycol stearate, I used 0.5 per cent of di-phenyl guanidine.

While very many balanced solvent compositions can be made for general purposes, as in making the beer can lacquer mentioned, I have used a mixture of 2 parts of p-methyl isopropyl benzene, 4 parts of decahydronaphthalene, 170 parts of toluol and 240 parts of xylol. A portion of the toluol was used in solvating the rubber chloride. The quantities of solvents mentioned were used with 100 parts rubber chloride of a 5.0 poise viscosity type and 30 parts of a solvating agent, in this instance the butyl ether of ethylene glycol stearate.

What I claim is:

1. As a new can for the preservation of food and beverages, a can body of ferrous metal lined with a continuous and poreless lining of rubber chloride free of the haze-forming impurities of rubber and in homogeneous union with a minor amount of an inert plasticizer to form a continuum, said rubber chloride being baked on said metal can body in the presence of a petronizing agent to give increased coherence to the said can body and to lessen its affinity for volatile solvents, said petronizing agent being selected from the class consisting of ureas, thioureas, dithiocarbamic acids, thiuram sulfides, mercapto-thiazoles, xanthates, carbanilides, guanidines and their saline compounds and aryl substitution products, and the reaction products of aldehydes and amines.

2. The container of claim 1 wherein the ferrous metal is tinned.

JAMES WALLACE RAYNOLDS.

CERTIFICATE OF CORRECTION.

Patent No. 2,229,602. January 21, 1941.

JAMES WALLACE RAYNOLDS.

It is hereby certified that error appears in the printed specification of the above numbered patent requiring correction as follows: Page 1, second column, line 26, for "good" read --food--; lines 27 and 28, strike out the words and comma "another chloride varnish for good containers, however,"; page 3, first column, line 23, for "ethers of the alkyl esters" read --esters of the alkyl ethers--; and that the said Letters Patent should be read with this correction therein that the same may conform to the record of the case in the Patent Office.

Signed and sealed this 18th day of February, A. D. 1941.

(Seal)

Henry Van Arsdale,
Acting Commissioner of Patents.